UNITED STATES PATENT OFFICE.

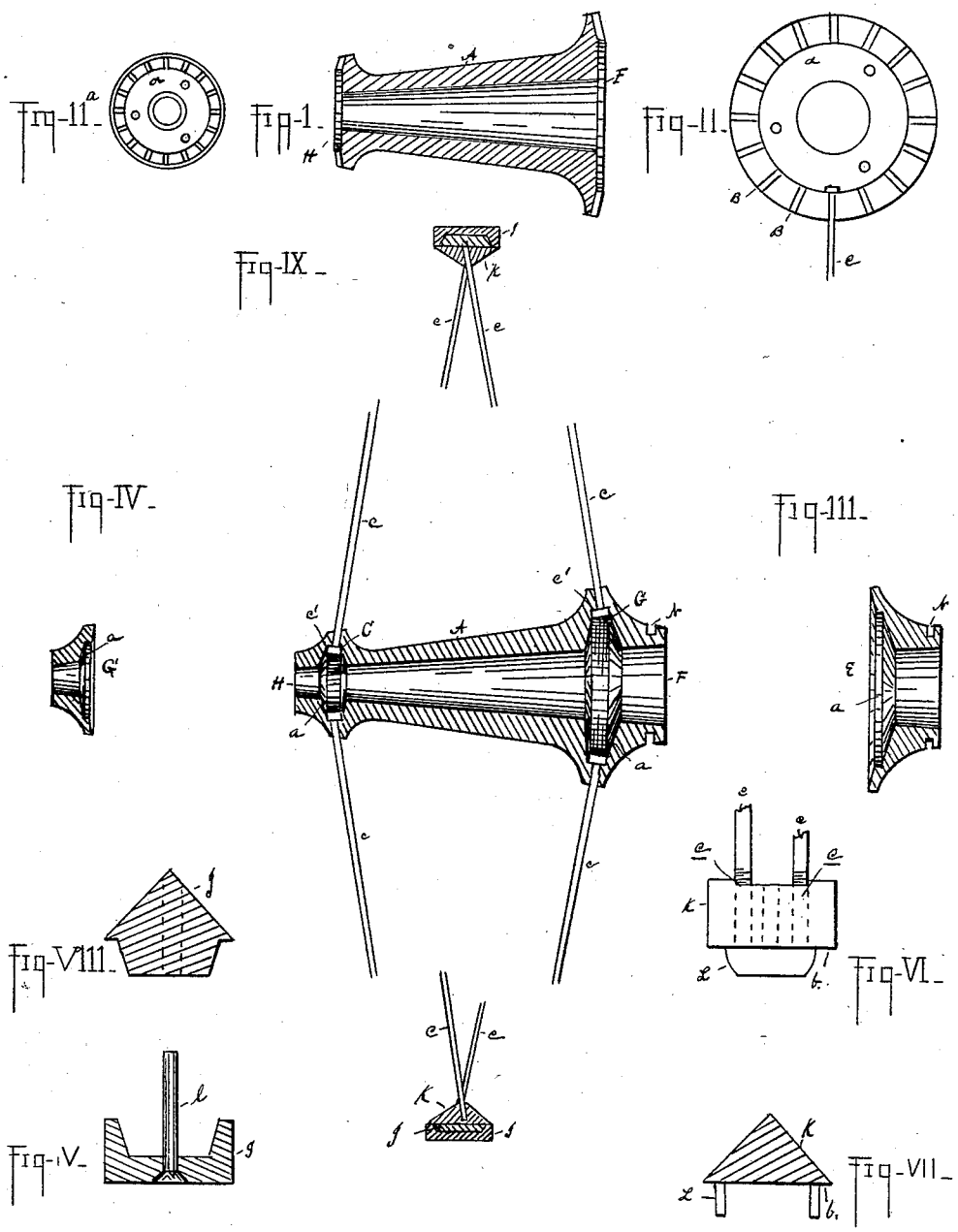

LLOYD H. DONKEL, OF APOPKA, FLORIDA.

VEHICLE-WHEEL.

SPECIFICATION forming part of Letters Patent No. 425,934, dated April 15, 1890.

Application filed November 20, 1889. Serial No. 330,978. (No model.)

*To all whom it may concern:*

Be it known that I, LLOYD H. DONKEL, a citizen of the United States, residing at Apopka, in the county of Orange and State of Florida, 5 have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to vehicle-wheels, especially adapted for buggies, wagons, carriages, or any vehicle to which it may be adapted.

It has for its object to construct a wheel in which the hub shall be suspended by the spokes from the tires, while the spokes will be permitted to move toward the center of the hub, thus giving the maximum of elasticity to the wheel, and at the same time distribute the strain through all the spokes, so that in addition to the increased elasticity there is also obtained greater strength with the minimum of weight.

The invention will be hereinafter particularly described and pointed out, reference being had to the accompanying drawings, forming a part hereof, and in which—

Figure I is a longitudinal section through the hub with the end caps removed. Figs. II and II$^a$ are end views showing some of the spokes in place. Fig. III is a cross-sectional view through one end cap; Fig. IV, a similar view through the other cap; Fig. V, an end view of a section of the tire; Fig. VI, a side and Fig. VII a sectional view of the lug, to which the spoke is secured in the tire. Fig. VIII is a section of the wood filling for the tire. Fig. IX is a view showing spokes in their working position.

In the drawings, the letter A designates the hub, made of steel or iron or other suitable material and formed interiorly, as shown, to receive boxings, such as are in common use. The face of each end of the hub is beveled, as shown, and formed with a recess or series of grooves B, designed to receive the inner ends of the spokes c, and at the ends of the grooves next to the bore of the hub with a recess C, made deeper than the grooves and intended to receive the heads of the spokes c', which are preferably made solid with the spokes c and have angular faces. These spokes are firmly held in their grooves by the caps E, which fit against the front end F of the hub, and the cap G, which fits against the other end H, the said caps bearing against the spokes and the flat sides of the solid heads, so as to hold them against turning and lateral vibration, the caps being held to the hubs by bolts passing through the two parts. The caps are recessed, as shown at a, so as to receive so much of the solid heads of the spokes as does not lie flush with the groove-faces of the ends of the hubs, and the faces of the caps, which bear against the spokes in the hub, are flat or made without grooves. This construction is different from forming the groove for the spokes in the caps, and allows of an adjustment of the spokes not to be obtained when the grooves are formed in the caps and not in the hub. The cap G has on its outside a groove N, so as to prevent sand or other substances from accumulating in the inside or bore of same.

The hollow portion of the tire I is provided with a filling J, of wood or other suitable material, that will deaden sound. The filling also prevents the hollow portion from filling with dirt, and the top face is beveled, so as to shed or throw off the dirt.

The blocks or lugs, into which the lower threaded ends of the spokes are screwed, are designated by the letter K. These blocks are of metal and formed with downwardly-extending ears or teeth L at such points that they can be driven into the wooden filling of the tire, and by so placing them shoulders or flanges b are formed to rest upon the top edges of the metal sides of the tire. These blocks are fitted to their places by cutting away a portion of the wooden filling flush with the top edge of the sides of the tire, and then driving the blocks into the spaces thus formed, and so as to force the teeth or ears L into the filling. A hole is then drilled through the blocks, the wooden filling, and the metal of the tire, and rivets l passed through the hole thus formed, so as to secure the parts together. This block is thus made to secure the wooden filling to the tire, and is formed with screw-threaded holes c, to receive the threaded ends of the spokes. The top face of the blocks K will be shaped to correspond with the shape of the top of the wooden filling.

It will be observed that the solid heads of the spokes fit against the faces of the recesses next to the grooves, which is the case when the spokes are adjusted to their working positions, and that quite a space is left between the heads of the spokes and the inner wall of the recess. This space is left so that the spokes may have a longitudinal play or movement at their end next to the hub when the tire strikes any hard obstruction, and thus by such play to distribute the strain over all the spokes and give the wheel greater elasticity. It will be observed, too, that under this construction the hub is entirely suspended from the tire by the spokes, and that as the strain is pulling from the top it also pulls from the sides, and thus makes the strain uniform over all the spokes. This pulling strain is evident, because as the hub is suspended and the spokes have an end movement next to the hub any obstruction or pressure that will force the tire inwardly at the point of contact with the obstruction will tend to change the circle of the wheel to an oblong sphere, and thus the pull will be uniformly through all the spokes.

In putting the wheel together the spokes are placed in the grooves in the hub with their heads lying in the recesses. The caps are then put in position and bolted tight enough to allow the spokes to turn, and their threaded ends are then screwed into their place in the blocks until all the parts are brought into proper place, and then the caps are securely bolted up, when the wheel is ready for use.

If any one or more spokes should become broken or it be necessary to replace it for any reason, it is only necessary to remove the end cap, unscrew the spoke, and replace it with another, as in the first instance.

The wheel so constructed possesses all the advantages hereinbefore assigned to it, and, besides combining the qualties of maximum elasticity and strength and minimum weight, it is also cheap to construct.

I would remark that in the construction of my wheel the caps E and G hold an important place. They extend the hub in its bearings upon the axle, giving strength to the wheel, and they enable me to place the spokes with their heads in the recess, a thing which would be impossible in a hub formed as shown without the use of the caps.

Having described my invention and set forth its merits, what is claimed is—

1. The vehicle-wheel having a hub formed at its ends with ways for the spokes to lie and freely move in, and with a recess beyond the inner ends of the ways to permit a movement of the spokes therein, said recess having walls adapted by their position and form to prevent the turning of the spokes in the ways, said spokes having heads which lie within the recess and so formed that projections may strike the walls of said recess and prevent their revolution, said hub being provided with caps to fit over the ends to form one side of the ways and one wall of the recess, substantially as set forth.

2. The vehicle-wheel having spokes which have heads at their inner ends and so formed that when they are in their place in the hub they cannot be turned in their ways, and a hub with ways for the spokes to lie and have free longitudinal movement in, and having a recess beyond the inner ends of the ways, in which said heads upon the inner ends of the spokes may lie and have free longitudinal movement, said hub being provided with caps to fit upon its ends to form one side of the ways in which the spokes move, also one wall of the recess, and to furnish an extension of the bearing of the hub upon its axle, substantially as set forth.

3. In a vehicle-wheel, the combination of spokes which have heads at their inner ends and so formed that when they are in their place in the hub they cannot be turned in their ways, and a hub with ways for the spokes to lie and have free longitudinal movement in, and having a recess beyond the inner ends of the ways, in which said heads upon the inner ends of the spokes may lie and have free longitudinal movement, said hub being provided with caps to fit upon its ends to form one side of the ways in which the spokes move, also one wall of the recess, and to furnish an extension of the bearing of the hub upon its axle, and a block firmly riveted to the tire of the wheel, which is adapted to form a nut to engage a screw upon the outer ends of said spokes, thereby forming a secure connection between the hub and rim of said wheel, substantially as described.

4. The vehicle-wheel having a hub formed at its ends with recesses to permit an end movement of headed spokes therein, and provided with caps fitting against said ends to hold the spokes in place, and recessed to receive the head of the spoke and bearing against the same to prevent it from turning, substantially as and for the purpose set forth.

5. The vehicle-wheel provided with a block having depending ears fitting below the top of the tire and secured thereto and formed to receive the lower ends of the spoke, substantially as and for the purpose set forth.

6. The vehicle-wheel provided with a cap having on its outside a groove to prevent sand or other substance from accumulating in the inside or bore of same, substantially as and for the purpose set forth.

In testimony whereof I have affixed my signature in presence of two witnesses.

LLOYD H. DONKEL. [L. S.]

Witnesses:
   THOS. D. BOURLAND,
   T. G. HYER.